(12) United States Patent
Xu et al.

(10) Patent No.: US 8,764,856 B2
(45) Date of Patent: Jul. 1, 2014

(54) DECOUPLED FLUIDIZED BED GASIFYING METHOD AND GASIFYING APPARATUS OF SOLID FUEL

(75) Inventors: Guangwen Xu, Tokyo (JP); Xinhua Liu, Tokyo (JP); Toshiyuki Suda, Tokyo (JP); Toshiro Fujimori, Yokohama (JP)

(73) Assignee: IHI Corporation (JP)

( * ) Notice: Subject to any disclaimer, the term of this patent is extended or adjusted under 35 U.S.C. 154(b) by 753 days.

(21) Appl. No.: 12/440,279

(22) PCT Filed: Aug. 29, 2007

(86) PCT No.: PCT/JP2007/066769
§ 371 (c)(1),
(2), (4) Date: May 6, 2009

(87) PCT Pub. No.: WO2008/029689
PCT Pub. Date: Mar. 13, 2008

(65) Prior Publication Data
US 2009/0265987 A1 Oct. 29, 2009

(30) Foreign Application Priority Data
Sep. 8, 2006 (CN) .......................... 2006 1 0113063

(51) Int. Cl.
*B01J 7/00* (2006.01)
*C10J 3/00* (2006.01)

(52) U.S. Cl.
USPC ................. 48/61; 48/89; 48/197 R; 48/127.1; 48/127.9; 48/77; 60/39.12; 60/39.464; 422/198; 422/600

(58) Field of Classification Search
USPC .................... 48/61, 89, 197 R, 127.9, 127.1; 60/39.12
See application file for complete search history.

(56) References Cited

U.S. PATENT DOCUMENTS

| 4,274,941 | A | 6/1981 | Janssen et al. |
| 2004/0045272 | A1 | 3/2004 | Miyoshi et al. |

FOREIGN PATENT DOCUMENTS

| JP | 51-64505 A | 6/1976 |
| JP | 10-1677 A | 1/1998 |

(Continued)

OTHER PUBLICATIONS

International Search Report dated Nov. 6, 2007, issued in corresponding international application No. PCT/JP2007/066769.
A presentation in an academic seminar: Piet Zuideveld and Jan de Graaf, "Overview of Shell global solutions' worldwide gasification developments," Gasification Technologies 2003, San Francisco, California, USA, Oct. 12-15, 2003.
U.S. Doe, "Practical Experience Gained During the First Twenty Years of Operation of the Great Plains Gasification Plant and Implications for Future Projects," http://www.fossil.energy.gov/programs/powersystems/publications/Brochures/dg_knowledge_gained.pdf#search='Lurgi%20SNG.

(Continued)

*Primary Examiner* — Kaity V. Handal
(74) *Attorney, Agent, or Firm* — Ostrolenk Faber LLP (57) ABSTRACT

The invention relates to a solid fuel decoupled fluidized bed gasifying method and a gasifying apparatus. By physically separately performing drying and pyrolyzing of fuel, gasification of char, and tar/hydrocarbon reforming, the interactions between the separated chemical reactions and physical processes during fluidized bed gasification can be utilized. Specifically, in a fluidized bed reactor having two reaction chambers, drying and pyrolyzing of fuel, gasification of char, and tar/hydrocarbon reforming are performed, respectively, the reforming of tar/hydrocarbon is promoted through the catalytic effect of the char, and the evaporated fuel moisture is provided to the char gasification and tar/hydrocarbon reforming as an effective reaction agent. Accordingly, the tar content in product gas can be reduced, the use amount of external steam can be reduced, the overall efficiency of gasification can be improved, and this technique can also be applied to the processing of high water-containing fuel. This gasifying method not only can be applied to individual fluidized bed gasification, but can contribute to the design of a combustor that combusts unreacted char, and to advanced decoupled fluidized bed gasification.

8 Claims, 4 Drawing Sheets

(56) References Cited

FOREIGN PATENT DOCUMENTS

| | | |
|---|---|---|
| JP | 2003-171673 A | 6/2003 |
| JP | 2004-517169 A | 6/2004 |
| JP | 2006-206840 | 8/2006 |
| JP | 2009-019870 | 1/2009 |

OTHER PUBLICATIONS

Notice of Allowance issued by Japanese Patent Office on Sep. 18, 2012 for corresponding Japanese Patent Application No. 2008-533118, including English language translation.

DECOUPLED FLUIDIZED BED GASIFYING METHOD AND GASIFYING APPARATUS OF SOLID FUEL

CROSS REFERENCE TO RELATED APPLICATIONS

The present application is a 35 U.S.C. §371 National Phase conversion of PCT/JP2007/066769, filed Aug. 29, 2007, which claims benefit of Chinese Application No. 200610113063.3, filed Sep. 8, 2006, the disclosure of which is incorporated herein by reference. The PCT International Application was published in the Chinese language.

TECHNICAL FIELD

The present invention relates to an art of solid fuel energy, and particularly, to a decoupled fluidized bed gasifying method of a solid fuel that uses moisture included in T the solid fuel itself as part of a gasifying agent, reduces generation of tar through the catalytic action of char produced by pyrolyzing of the fuel, and gasifies the fuel with high efficiency, and a gasifying apparatus based on the gasifying method. The decoupled fluidized bed gasifying method of a solid fuel and the gasifying apparatus are applied to a high water-containing solid fuel, as brown coal, production residue of food, beverage, or seasoning, and sewage sludge.

BACKGROUND ART

Gasification of a solid fuel is one of the most fundamental techniques required for the energy in future, and the fuel and chemical raw material industry. Coal, biomass, and various kinds of solid waste are converted into product gas or synthetic gas by the gasification. The product gas can be used as a fuel of a high-efficiency energy system, or can be converted into synthetic natural gas by further purification and methanation, and can be a high-quality fuel and a chemical raw material instead of natural gas. Further, the synthetic gas is a source gas in various chemosynthesis processes, and can also produce base chemical raw material, such as methanol or dimethyl ether (DME), by synthesis, but also can produce various kinds of fuel oil that substitutes for a petroleum product.

In the situation of the resource environment where petroleum resources are drained day by day, and the price soars, manufacturing the above-described various kinds of industrial sources and fuel from various kinds of solid-state resources (coal, biomass) or raw materials (various kinds of organic matters including waste) using a gasifying means is a flow that is not avoided. Accordingly, the need for a gasifying technique is increasing globally.

Research and development of the gasifying technique already have 100 years or more of history, and various techniques are settled. The features of the main gasifying techniques developed until now and the situation of applications are summarized in Table 1. Although fixed bed gasification has little capitalization and has the feature, such as simple operation, since it is difficult to apply this gasification on a large scale, the gasification is typically applied only to a distributed energy system that uses biomass and waste as fuel. Although the updraft pressurization fixed-bed coal gasification furnace by Lurgi has comparatively large application in chemical fertilizer and synthetic oil production (by parallel installation of several tens of gasifying furnaces), it is considered that most of them transit to other gasifying techniques suitable for the application to enlargement. Since the highest reaction temperature of the fluidized bed gasification (pressurization or normal pressure) is limited to about 900° C., it is impossible to produce only the product gas containing hydrocarbons, such as methane. Accordingly, such gasification is mainly applied to high-efficiency energy production systems, such as an IGCC (pressurization), a gas turbine (pressurization), and a gas engine. As the scale of energy, there are middle-sized applications of several tens of megawatts (MW) through large-large applications of 100 MW or more. Although decoupled fluidized bed gasification is a special fluidized bed gasifying technique and generates reaction heat using air, it has the feature that the generated product gas is not diluted with $N_2$ of combustion air, and $CO_2$ produced by combustion. Accordingly, this technique can be applied to synthetic natural gas (SNG) production of middle energy scale, and large-scale cogeneration systems (for example, the production of fuel gas and tar by pyrolyzing and electric power generation by combustion). The reaction temperature of the entrained flow gasification using pure oxygen is 1300 to 1700° C., and the synthetic gas that does not contain tar but contains hydrocarbons a little is produced. Since temperature is high, pure oxygen is used, pressurization is made, cost is high, and technical difficulty exists, it can be applied only to large-scale systems (>100 MW).

TABLE 1

| Features of representative gasification techniques | | | |
| --- | --- | --- | --- |
| Gasification Technique | Energy Scale | Application Target | Important Problems |
| Two-step gasification | <10 MW | Heat supply, Distributed cogeneration (application to large-scale is difficult) | Simplification of operation, increase of efficiency, removal of tar (excluding down-draft), increase of calorific value, reduction of cost |
| * Fluidized bed (including BFB, CFB, SB) | >10 MW (typically, 10 to 100 MW) | Gas engine, gas turbine, fuel gas, IGCC (>100 MW) | Technical demonstration, increase of calorific value, gas refinement in furnace, high-temperature dust removal, efficiency optimization, low calorific value combustor |

TABLE 1-continued

Features of representative gasification techniques

| Gasification Technique | Energy Scale | Application Target | Important Problems |
|---|---|---|---|
| Decoupled fluidized bed | 10 to 100 MW, co-production 100 MW or less | Gas engine, co-production, fuel gas, SNG, $H_2$ | Technical demonstration, efficiency improvement, gas refinement in furnace, processing of high water-containing fuel |
| Entrained flow (typically using pressurization and oxygen) | >100 MW | Chemical synthesis, $H_2$, IGCC | Development of the present technique to be applied to non-coal fuels, such as biomass |

Note:
BFB represents a bubbling fluidized bed, CFB represents a circulating fluidized bed, and SB represents a spouted fluidized bed.

Accordingly, in applications of the gasifying techniques, the decoupled cogeneration based on the fixed-bed gasification in an early period, the concentrated cogeneration and SNG fuel production based on the distributed fluidized bed gasification in a middle period (after five to ten years), the $H_2$ production, chemosynthesis, IGCC, etc. based on pressurized entrained flow/fluidized bed gasification in a long period (after 10 to 15 years), are expected. However, various kinds of gasifying techniques themselves should be further developed. The problems to be solved about each technique are mentioned in the column "Important problems" in Table 1. Asian nations including China and Japan clearly fall behind Western countries in terms of the gasifying techniques, and particularly, the techniques and development ideas with unique features in pressurized gasification, entrained flow gasification, and decoupled fluidized bed gasification are scarce. In view of the fact that the main application of the gasifying techniques exists in China and Southeast Asia, it is considered that it is necessary to make research and development of a new gasifying technique.

The solid fuel gasification represents a reaction complex that combines drying/pyrolyzing of fuel, gasification of char, tar/hydrocarbon reforming, and four combustion chemical reactions that generate the reaction heat required for the chemical reactions. These reactions have their independent functions, are related to one another, and form a complicated chemical reaction network. How this chemical reaction network is managed and utilized is a basic factor that determines the merit of a gasifying technique. Actually, steam and tar are generated by drying/pyrolyzing of fuel. The tar is a fundamental reactant of a reforming reaction and the steam emitted by drying can be used as a reaction agent of two reactions including gasification of char, and tar/hydrocarbon reforming. Simultaneously, when the reforming reaction is performed in the same reaction space as the gasification of char, the char itself can be gasified, and simultaneously can provide a catalytic effect to tar/hydrocarbon reforming reaction. By down-draft fixed-bed gasification, the tar content of the generated product gas can be reduced to several tens of milligrams. This supports the catalyst or promoting effect over tar decomposition of the char. All three reactions including drying and pyrolyzing of fuel, gasification of char, and tar/hydrocarbon reforming are endothermic reactions, and combustion of a combustible gas generated in part of the char or these reactions provides reaction heat exactly required for the reactions. However, when the carbon dioxide ($CO_2$) that is generated by the combustion reaction and air-oxidation agent are used, a larger amount of mixed nitrogen ($N_2$) may become inactive ingredients that dilute the product gas.

DISCLOSURE OF THE INVENTION

Problems to be Resolved by the Invention

In the above-described conventional fluidized bed gasification, each chemical reaction of the gasification reaction complex simultaneously occurs in the same reaction space (that is, inside the fluidized bed gasifying reactor). Thus, it is difficult to perform optimized control of the gasification reaction process. Therefore, in the conventional fluidized bed gasification, it is difficult to effectively refine the product gas in the gasifying reactor, and the tar content of the produced product gas is high, and the improvement in gasification efficiency is also affected. On the other hand, in the conventional fluidized bed gasifying technique, it is difficult to process a high water-containing fuel containing a moisture content of 40 wt % or more. As high-quality fossil resources (coal, petroleum) decrease gradually, it is considered that it is indispensable to effectively utilize low-quality energy resources, such as high water-containing residues produced by brown coal, sewage sludge, various industrial processes (for example, food, beverage, or seasoning industry), etc.

Means to Resolve the Problems

The object of the invention is to provide a fuel decoupled fluidized bed gasifying method that makes it possible to solve the above problems.

In the invention, by releasing combination between drying/pyrolyzing of a fuel concerning a gasifying process, and the subsequent gasification reactions, i.e., gasification of char and tar/hydrocarbon reforming, thereby allowing utilization of the interactions between the respective reactions, purification of the product gas in the gasifying process is strengthened, and by utilizing evaporated fuel moisture itself as part of a gasifying agent, the tar content in the product gas is reduced, the gasification efficiency is improved, and the method of the invention is also applied to processing of high water-containing solid fuel.

Further, another object of the invention is to provide a gasifying apparatus that realizes a solid fuel decoupled fluidized bed gasifying method.

The techniques of the invention are as follows.

A solid fuel decoupled fluidized bed gasifying method of the invention includes physically separately performing drying and pyrolyzing of fuel, gasification of char, and tar/hydrocarbon reforming, which are involved in fuel gasifying processes, thereby sequentially performing all the gasifying processes in two steps including drying and pyrolyzing of a fluidized bed fuel, and gasification of a fluidized bed char, and tar/hydrocarbon reforming. The drying and pyrolyzing of the fluidized bed fuel is performed by supplying solid fuel to a drying and pyrolyzing reaction chamber within the drying and pyrolyzing reaction chamber, fluidizing the solid fuel by a fluidizing gas supplied from the bottom of the drying and pyrolyzing reaction chamber, and keeping the temperature of the drying and pyrolyzing reaction chamber at 500 to 1000° C. according to the amount of heat generated by combustion by the oxygen included in the fluidizing gas and/or the amount of heat possessed by the high-temperature heat-medium particles of the drying and pyrolyzing reaction chamber. The gasification of the fluidized bed char, and the tar/hydrocarbon reforming are performed in a gasifying and reforming reaction chamber that communicates with the drying and pyrolyzing reaction chamber adjacent thereto, steam generated by the drying and pyrolyzing of the fuel that has passed through the drying and pyrolyzing reaction chamber, and pyrolyzing gas and char containing tar are sent to the gasifying and reforming reaction chamber, without performing other intermediate processing, and are fluidized by a gasifying agent supplied from the bottom of the gasifying and reforming reaction chamber, the temperature of the gasifying and reforming reaction chamber is kept at 500 to 1000° C. according to the amount of heat generated by combustion of the oxygen included in the gasifying agent and/or the amount of heat possessed by the high-temperature heat-medium particles from the drying and pyrolyzing reaction chamber, char is gasified and tar/hydrocarbon is reformed to generate product gas, and the generated product gas is discharged from an upper part of the gasifying and reforming reaction chamber.

The steam generated by drying and pyrolyzing of the fuel in the drying and pyrolyzing reaction chamber, and the pyrolyzing gas and char containing tar are sent into a particle layer in the gasifying and reforming reaction chamber, and the steam is provided to gasifying and reforming reactions as a gasifying agent. The tar/hydrocarbon reforming is performed when the pyrolyzing gas and steam flow through a fluidized bed particle layer having char, thereby exhibiting the catalytic effect of the char to the reforming reaction.

The high-temperature heat-medium particles from outside to be supplied to the drying and pyrolyzing reaction chamber provide the amount of heat required for drying and pyrolyzing of fuel by the interaction between the flow of the particles and a fuel supplied to the drying and pyrolyzing reaction chamber, and the particles provides reaction heat to gasification of char and tar/hydrocarbon reforming after being conveyed to the gasifying and reforming reaction chamber, and the heat medium particles from outside whose temperature has fallen by providing the amount of heat to the gasification of char, and tar/hydrocarbon reforming are discharged from the gasifying and reforming reaction chamber.

Further, a solid fuel decoupled gasifying apparatus includes: a fluidized bed including a drying and pyrolyzing reaction chamber located on the fuel supply side of the fluidized bed, and a gasifying and reforming reaction chamber that communicates with the drying and pyrolyzing reaction chamber adjacent thereto; a horizontal gas dispersion plate that is installed for both the reaction chambers and located at a predetermined height in both the reaction chambers; a first gas dispersion box and a second gas dispersion box that are located below the gas dispersion plate, and correspond to the drying and pyrolyzing reaction chamber and the gasifying and reforming reaction chamber, respectively; a fluidizing gas supply passage that provides fluidizing gas through the first gas dispersion box; a gasifying agent supply passage that provides a gasifying agent through the second gas dispersion box; a solid fuel supply means attached to an upper part of the drying and pyrolyzing reaction chamber; and a product gas outlet attached to an upper part of the gasifying and reforming reaction chamber.

The drying and pyrolyzing reaction chamber and the gasifying and reforming reaction chamber are formed by division of the fluidized bed by a reaction chamber partition plate, a gap between a lower end of the reaction chamber partition plate, and the gas dispersion plate is a transport passage that allows the drying and pyrolyzing reaction chamber to communicate with a gasifying and reforming reaction chamber, and the lower end of the reaction chamber partition plate is located in a particle layer of the fluidized bed.

Further, an upper end of the reaction chamber partition plate is fixed to an inner surface of a container that forms the fluidized bed, and a lower part of the reaction chamber partition plate inclines toward the gasifying and reforming reaction chamber.

Further, the gas dispersion plate are divided into a first gas dispersion plate and a second gas dispersion plate by a gas dispersion box partition plate located between the first gas dispersion box and the second gas dispersion box, and the first gas dispersion plate corresponding to the drying and pyrolyzing reaction chamber inclines downward toward the second gas dispersion plate.

Further, the solid fuel decoupled fluidized bed gasifying apparatus of the invention further includes a heat medium particle reheater that communicates with the particle layer of the gasifying and reforming reaction chamber. An upper end of the heat medium particle reheater communicates with a cyclone separator, and a lower end of the cyclone separator is provided with a high-temperature heat-medium particle supply passage that leads to the particle layer of the drying and pyrolyzing reaction chamber.

The decoupled fluidized bed gasifying method according to the invention, and the principle of operation will be described with reference to FIG. 1.

The gasifying process of a solid fuel occurs in two fluidized bed reaction chambers (the chambers are equivalent to two fluidized bed reactors. In this case, they communicate with each other in accordance with the requirements need to be described below). The solid fuel is supplied to one of the fluidized bed reaction chambers, the fluidized bed reaction chamber is used as a drying and pyrolyzing chamber, and the fluidizing gas capable of containing oxygen content is used to fluidize the supplied solid fuel particles, and the time during which the fuel is retained in the reaction chambers is controlled, so that the physical changes and chemical reactions that occur during that time can be mainly drying of the fuel and pyrolyzing of the fuel. The generated steam, pyrolyzing gas (containing tar), and char are sent to another fluidized bed reaction chamber serving as the gasifying and reforming reaction chamber through a transport passage, without passing through any other intermediate processing. The invention has a feature that the two reaction chambers are typically adjacent to each other laterally, and the transport of gas and particles between the reaction chambers is performed inside the particle layer of both the chambers to be fluidized. A gasifying agent capable of containing the oxygen, which is supplied to the gasifying and reforming reaction chamber, is provided to the gasification reaction of char particles while fluidizing the char particles from the right drying and pyrolyzing reaction chamber as a fluidizing gas. After the tar in the pyrolyzing gas that is generated in the right drying and pyrolyzing reaction chamber enter the left gasifying and reforming reaction chamber, it is reformed and decomposed by the interaction with a gasifying agent, and it also performs reforming and decomposing of hydrocarbons. Since the reforming reaction and the gasification of the char occur in the same space, the char can exhibit a catalytic effect to reforming and decomposing reactions of tar and hydrocarbons as a catalyst. Meanwhile, after the steam generated by drying of the fuel is sent into the particle layer of the gasifying and reforming reaction chamber, the steam is provided for gasification of the char and tar/hydrocarbon reforming reaction, as part of a gasifying agent. The generated final product gas is discharged from the upper part of the gasifying and reforming reaction chamber, and waste, such as stone that is included in the fuel and that cannot be gasified, is discharged from the bottom of the gasifying and reforming reaction chamber.

In the gasifying process, both the physical changes and chemical reactions that occur in both the drying and pyrolyzing reaction chamber and the gasifying and reforming reaction chamber require a large amount of absorption heat. This amount of heat is secured by making a required amount of oxygen (pure oxygen or air) included in the fluidizing gas to be supplied to the drying and pyrolyzing reaction chamber and the gasifying agent to be supplied to the gasifying and reforming reaction chamber, and by combusting part of an original fuel and part of combustible gas generated by the pyrolyzing/gasification of the fuel. Further, a required amount of heat can also be provided by supplying other external heat sources, such as high-temperature particles, to the (right) drying and pyrolyzing reaction chamber (right in the drawing). These high-temperature particles are typically called heat medium particles. The high-temperature heat-medium particles are fluidized along with the fuel particles and the char when entering the (right) drying and pyrolyzing reaction chamber and the (left) gasifying and reforming (left) chamber (left in the drawing) sequentially, and the amount of heat held by the particles is transferred to the fuel and char particles, thereby realizing drying and pyrolyzing of the fuel and gasification of the char. Meanwhile, the pyrolyzing gas is heated directly by contacting the high-temperature heat-medium particles, so that reforming and decomposing reactions of the tar and hydrocarbons can be held. The heat medium particles after supplying the heat amount are typically discharged from the upper part of the particle fluidized bed of the left gasifying and reforming reaction chamber. The heat medium particles at this time have already significantly fallen in temperature, and are again reused after heating and temperature rise.

Although the reaction temperature of both the reaction chambers is controlled within a wide range if necessary, in order to avoid the difficulty of fluidization caused by melting of fuel ash while maintaining drying of the fuel and the speed of pyrolyzing and gasifying sufficiently quickly, it is necessary to keep the temperature at 500° C. or more and 1000° C. or less. Typically, although it is desirable that the temperature of the left gasifying and reforming reaction chamber is made higher than the temperature of the right drying and pyrolyzing reaction chamber, this is not indispensable condition. The content of oxygen in the fluidizing gas to be supplied to the drying and pyrolyzing reaction chamber and in the gasifying agent to be supplied to the gasifying and reforming reaction chamber are controlled according to the required temperature of both the chambers. According to the general operation experience of fluidized bed gasification, it is necessary to set the ratio of air (or oxygen) in both the reaction chambers to the fuel to be supplied to be 0.4 or less. Here, the oxygen ratio indicates the percentage to the amount of oxygen required to perfectly combust the fuel to be supplied (when air is used, the oxygen ratio is calculated according to the amount of oxygen contained in the air). When external heat sources, such as heat medium particles, are used, a still lower oxygen ratio is required. At this time, the drying and pyrolyzing reaction chamber may not require oxygen supply (the oxygen ratio is zero), and the gasifying and reforming reaction chamber requires only a comparatively low oxygen ratio, and is replenished with heat medium particles by the amount of heat that is deficient in supply.

As can be clear, the gasifying method can be applied to any operation pressure, although it can typically be operated under normal pressure. In addition, the solid fuel indicates, for example, various kinds of coal, biomass, and waste.

As compared with the typical fluidized bed gasification, the gasifying method of the invention is typically characterized by dividing into two sets four sub-reactions including drying of fuel, pyrolyzing of the fuel, gasification of char, and tar/hydrocarbon reforming, which occur in the same space, to physically separate the former two reactions and the latter two reactions, thereby allowing utilization of the interactions between these reactions. The interactions to be realized include (1) the catalytic effect of the char on the tar/hydrocarbon reforming; (2) acting on the gasification of the char and the tar/hydrocarbon reforming, using the steam generated by drying of the fuel as a gasifying agent; and (3) realizing micro-control of a gasifying process to each control by a separation reaction process.

Effects of the Invention

According to the invention, the technical effects including (1) the reduction of the tar content of product gas, (2) the decrease of the use amount of the steam gasifying agent, (3) the improvement in gasification efficiency, and (4) the processing of high water-containing fuel can be realized using the above technical features. In the left gasifying and reforming reaction chamber, the place for the tar reforming and decomposition can be provided, but also the catalytic effect of the char on the tar reforming/decomposition reaction can be exhibited. This is because the high efficiency of gasification is caused not only by an increase in the tar conversion ratio, but also by a decrease in the use amount of the steam gasifying agent, and the high use amount of the steam surely reduces overall gasification efficiency. Since the steam generated by drying can also be effectively used as part of a gasifying agent by separation between drying of fuel and gasification of char, the gasifying method according to the invention can also be applied to processing of high water-containing fuel. It is still more important to effectively utilize high water-containing low-quality fuels, such as brown coal, sludge, and residues of food, beverage, or seasoning industry for security of energy in the future.

BRIEF DESCRIPTION OF THE DRAWINGS

Detailed Description of the Invention

DESCRIPTION OF REFERENCE NUMERALS AND SIGNS

2: UNIFIED HORIZONTAL GAS DISPERSION PLATE
8: HEAT MEDIUM PARTICLE REHEATER
10: REACTION CHAMBER PARTITION PLATE
11: RIGHT DRYING AND PYROLYZING REACTION CHAMBER
12: LEFT GASIFYING AND REFORMING REACTION CHAMBER
21: FIRST GAS DISPERSION PLATE
22: SECOND GAS DISPERSION PLATE
31: A FIRST GAS DISPERSION BOX
32: A SECOND GAS DISPERSION BOX
40: HIGH-TEMPERATURE HEAT-MEDIUM PARTICLE SUPPLY PASSAGE
41, 43: FLUIDIZING GAS SUPPLY PASSAGE
42, 44: GASIFYING AGENT SUPPLY PASSAGE
71: GASIFIER CYCLONE SEPARATOR
A: CONTAINER

BEST MODE FOR CARRYING OUT THE INVENTION

Figure 1:
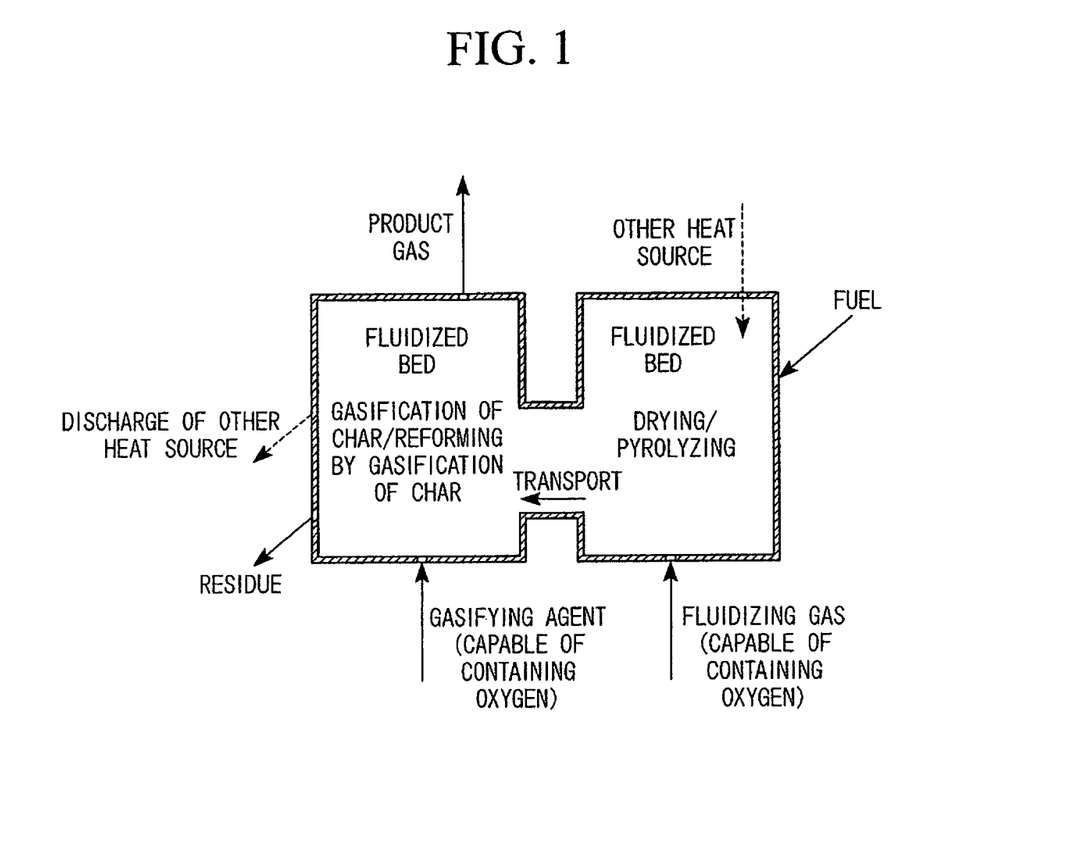
FIG. 1 is a schematic diagram showing the principle of a solid fuel decoupled fluidized bed gasifying method of the invention.
Figure 2:
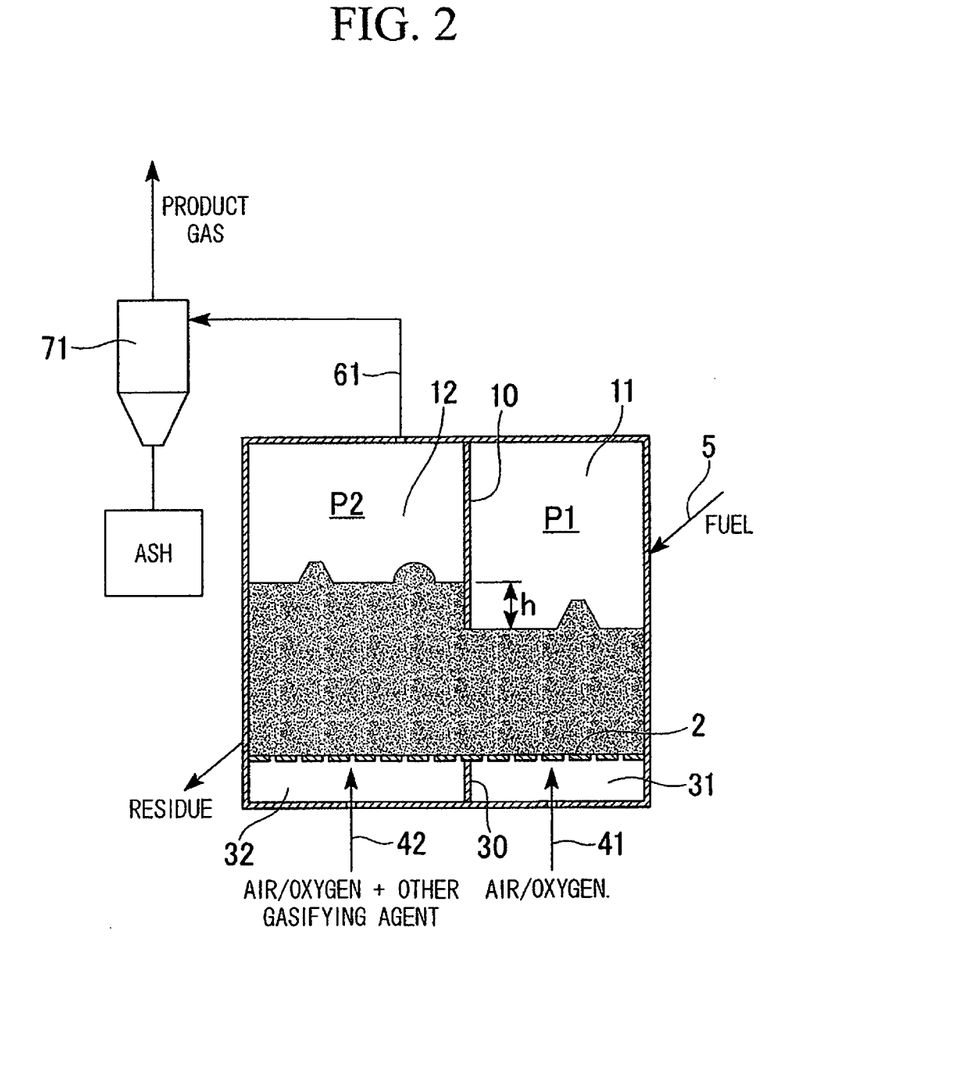
FIG. 2 is a schematic diagram of the structure of a gasifying apparatus, embodying the gasifying method of the invention, which supplies reaction heat using internal combustion.

FIG. 2 is a schematic diagram of the structure of a decoupled fluidized bed gasifying apparatus, embodying the gasifying method of the invention shown in FIG. 1, which supplies reaction heat using internal combustion. This apparatus A mainly includes a right drying and pyrolyzing reaction chamber 11 (abbreviated as a right reaction chamber 11.), a left gasifying and reforming reaction chamber 12 (abbreviated as a left reaction chamber 12.), and a right gas dispersion box (a first gas dispersion box) 31 and a left gas dispersion box (a second gas dispersion box) 32 that are installed in correspondence with the lower parts of both the right and left reaction chambers. A fluidizing gas supply passage 41 and a gasifying agent supply passage 42 that communicate with the drying and pyrolyzing reaction chamber 11 and the gasifying and reforming reaction chamber 12, respectively, are installed at the bottom of both the gas dispersion boxes.

In the embodiment shown in FIG. 2, the right and left reaction chambers that constitute a container A of a fluidized bed actually are obtained by dividing one large fluidized bed reaction space into two sub reaction spaces via a reaction chamber partition plate 10. Accordingly, a unified horizontal gas dispersion plate 2 is also provided in both the reaction chambers. Although the lower end of the reaction chamber partition plate 10 is buried inside a particle layer in the right reaction chamber 11 and the left reaction chamber 12, the lower end is held at sufficiently high distance from the horizontal gas dispersion plate 2 to form a passage that communicates both the reaction chambers. Further, the upper end of the reaction chamber partition plate 10 is fixed to an inner surface of the fluidized bed container A. Moreover, the horizontal gas dispersion plate 2 is divided into a first gas dispersion plate 21 and a second gas dispersion plate 22 by the gas dispersion box partition plate 30 located between the right gas dispersion box 31 and the left gas dispersion box 32 below the reaction chamber partition plate 10.

According to the principle of the gasifying method of the invention, the fuel from a fuel supply passage 5 is introduced into a free space above the particle layer of the drying and pyrolyzing right reaction chamber 11 (right) from the upper part of the right reaction chamber 11, generated final product gas is discharged via a product gas outlet 61 from an upper end of the gasifying and reforming right reaction chamber 12 (left), and mixed particles are removed via a gasifier cyclone separator 71. In the drawing, the fluidizing gas to be supplied to the drying and pyrolyzing reaction chamber 11 by the fluidizing gas supply passage 41 is air or pure oxygen, and the gasifying agent to be supplied to the gasifying and reforming left reaction chamber 12 by the gasifying agent supply passage 42 is, for example, other gasifying agents that contain air or oxygen, such as steam. Accordingly, internal combustion is caused in both the reaction chambers by the oxygen contained in the fluidizing gas or gasifying agent, and the temperatures of both the reaction chambers are held at 500 to 1000° C. (Centigrade) while the amount of heat required for various kinds of endothermic chemical reactions and physical change processes (including heating and drying) that occur in both the chambers. Although the temperatures of both the reaction chambers can be made equal to each other, generally, it is preferable that the temperature of the left gasifying and reforming reaction chamber 12 is slightly higher. As described in the above principle of the invention, this temperature adjustment can be secured by controlling the amount of oxygen in the fluidizing gas and gasifying agent to be supplied, that is, by adjusting the ratio of oxygen or air to the fuel that is supplied to these gas supply passages. According to the actual operation experience of some oxidization gasification methods, the air ratio or oxygen ratio of both the reaction chambers is typically required to be 0.4 or less.

Drying of fuel and pyrolyzing of the fuel are performed under the condition that the time during which the fuel to be supplied to the right drying and pyrolyzing reaction chamber 11 is retained in this reaction chamber is, for example, below one minute, and the steam, tar-containing pyrolyzing gas, and char that are generated by the drying and pyrolyzing are further sent to the left gasifying and reforming reaction chamber 12 via a transport passage between the reaction chamber partition plate 10 and the horizontal gas dispersion plate 2. Accordingly, although the fuel supply passage 5 will supply fuel onto the particle layer of the drying and pyrolyzing reaction chamber 11, this is equivalent to supplying fuel onto the particle layer for the whole gasifying reactor including the gasifying and reforming reaction chamber 12. As a result, the loss of fuel by mixing to gas can be suppressed effectively, and when tar-containing pyrolyzing gas further flows through the particle layer in the gasifying and reforming reaction chamber 12, the gas are made to contact particles, so that the tar in the gas and further reforming and pyrolyzing of hydrocarbons can be promoted.

In order to keep gas and particles flowing into the left gasifying and reforming reaction chamber 12 from the right drying and pyrolyzing reaction chamber 11 via a passage below the reaction chamber partition plate 10, the pressure P1 in the right reaction chamber 11 is necessarily higher than the pressure P2 in the left reaction chamber 12. As a result, the particle layer in the right reaction chamber 11 becomes lower than the particle layer in the left reaction chamber 12. The height difference h between the particle layers is determined by an actual pressure difference (P1-P2) between the pressures P1 and P2. Typically, since the surface of the particle layer in the right reaction chamber 11 is changed in the vicinity of the lower end of the reaction chamber partition plate 10, the height of the particle layer in the right reaction chamber 11 is roughly determined by the spacing (that is, the height of a gap) between the lower end of the partition plate 10, and the gas dispersion plate 2. On the other hand, in order to realize normal operation of both the right and left reaction chambers, the height of a stationary layer of the particles in the particle layer should be made higher than the lower end of the reaction chamber partition plate 10. As the particles to be put into the particle layer become more, the height of the particle layer of the left reaction chamber 12 also increases. However, there is a possibility that the height of the particle layer in the right reaction chamber 12 remains in the vicinity of the lower end of the partition plate 10. Therefore, the pressure difference (P1-P2) and the particle layer height difference h increase according to an increase in the amount of filling of particles, and conversely, if the lower end of the partition plate 10 is adjusted highly, the pressure difference (P1-P2) and the difference h can be lowered instead.

As can be clear, all the technical features of the decoupled fluidized bed gasifying method of the invention can be realized by the apparatus shown in FIG. 2. That is, drying and pyrolyzing of fuel are performed in the right reaction chamber 11, the generated char is further gasified in the left reaction chamber 12, and the tar/hydrocarbons in the fuel pyrolyzing gas are reformed/decomposed. The char fluidized in the left reaction chamber 12 exhibits a catalytic effect on a char/hydrocarbon reforming reaction performed simultaneously with the fluidization. Further, after the steam generated by evaporation of the fuel moisture in the right reaction chamber 11 flows into the left reaction chamber 12, the steam should be provided for gasification of char and tar/hydrocarbon reforming reaction, as a gasifying agent. Simultaneously, the steam can promote CO denaturation reaction and can increase $H_2$ content in product gas simultaneously. All these operations are actually realized using the decoupled fluidized bed reactor shown in FIG. 2 by canceling drying of fuel and pyrolyzing of the fuel, from gasification of char and tar/hydrocarbon reforming. This makes it possible to utilize the interaction between the above reactions.

Moreover, separation of the above reactions is controlled for each of the released reactions. For example, for the fuel pyrolyzing in the right reaction chamber 11 and the gasification reaction of char in the left reaction chamber 12, different gasifying agents (or fluidizing gases) are supplied, and different reaction temperatures are adopted. In general fluidized bed gasification, all chemical reactions and physical processes involved in the gasification are performed simultaneously in the same space, and one, or one or more of the chemical reactions and the physical processes cannot be independently controlled. In contrast with the macro control of all the gasification reaction systems, in the invention, control of one or one or more reactions has substantially been realized as micro adjustment and control for a reaction. As described above, by reaction control in various scales, optimization of a gasifying process can be realized, and the greatest reaction efficiency can be expected.

It is possible to expect that the gasifying apparatus shown in FIG. 2 achieves the following effects on the basis of the various features realized by the separation of the reactions. First, the tar content of final product gas can be sufficiently reduced by performing reforming and decomposing of tar using the catalytic effect of char in the left gasifying and reforming reaction chamber 12. Next, if the steam generated in the left reaction chamber 12 by evaporation of the fuel moisture from the right drying and pyrolyzing reaction chamber 11 is utilized as a gasifying agent, the use amount of the gasifying agent to be supplied from outside can be reduced. The increasing tar conversion ratio is further added, and high-efficiency gasification can be implemented by the gasifying apparatus of the invention. Further, gasification efficiency can be further improved by suppression of any possible fuel loss by mixing to the gas in the left reaction chamber 12, separated fuel pyrolyzing and char gasification, and differential control of two sets of reactions of tar reforming. Thirdly, since fuel is first dried in the right drying and pyrolyzing reaction chamber 11, and the fuel moisture that is evaporated in the left gasifying and reforming reaction chamber 12 is utilized as an effective gasifying agent, the gasifying apparatus of the invention can be applied to processing of high water-containing fuel. In typical fluidized bed gasification, it is difficult to directly process, for example, fuel containing a moisture content of 40 wt. %, such as brown coal, sewage sludge, and various residues in food, beverage, and seasoning industries. In contrast, the tar content of product gas is lower compared with the typical fluidized bed gasification as well as the gasifying apparatus shown in FIG. 2 can be used for high-efficiency processing of these fuels.

Of course, the decoupled gasifying apparatus shown in FIG. 2 can also be used for typical non-high water-containing fuels, improve the efficiency of the typical fluidized bed gasification, and strengthen the tar conversion in product gas. Although it is clear that this decoupled gasifying apparatus can be applied even under any pressure, when the apparatus is used for fuels, such as biological substance and sewage sludge, it is typically operated under normal pressure. This is because the capacity of the apparatus in this case is typically lower than 100 MW and is only several megawatts.

Figure 3:
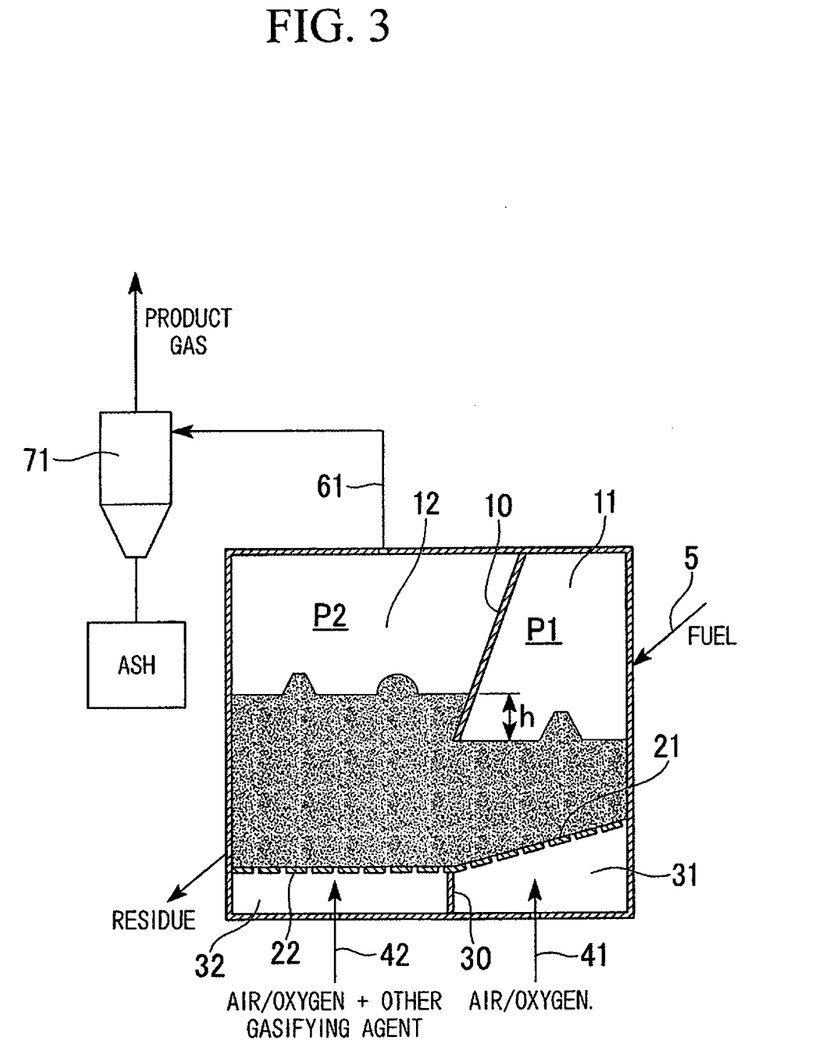
FIG. 3 is a schematic diagram of the structure of another gasifying apparatus, embodying the gasifying method of the invention, which supplies reaction heat using internal combustion.
Figure 4:
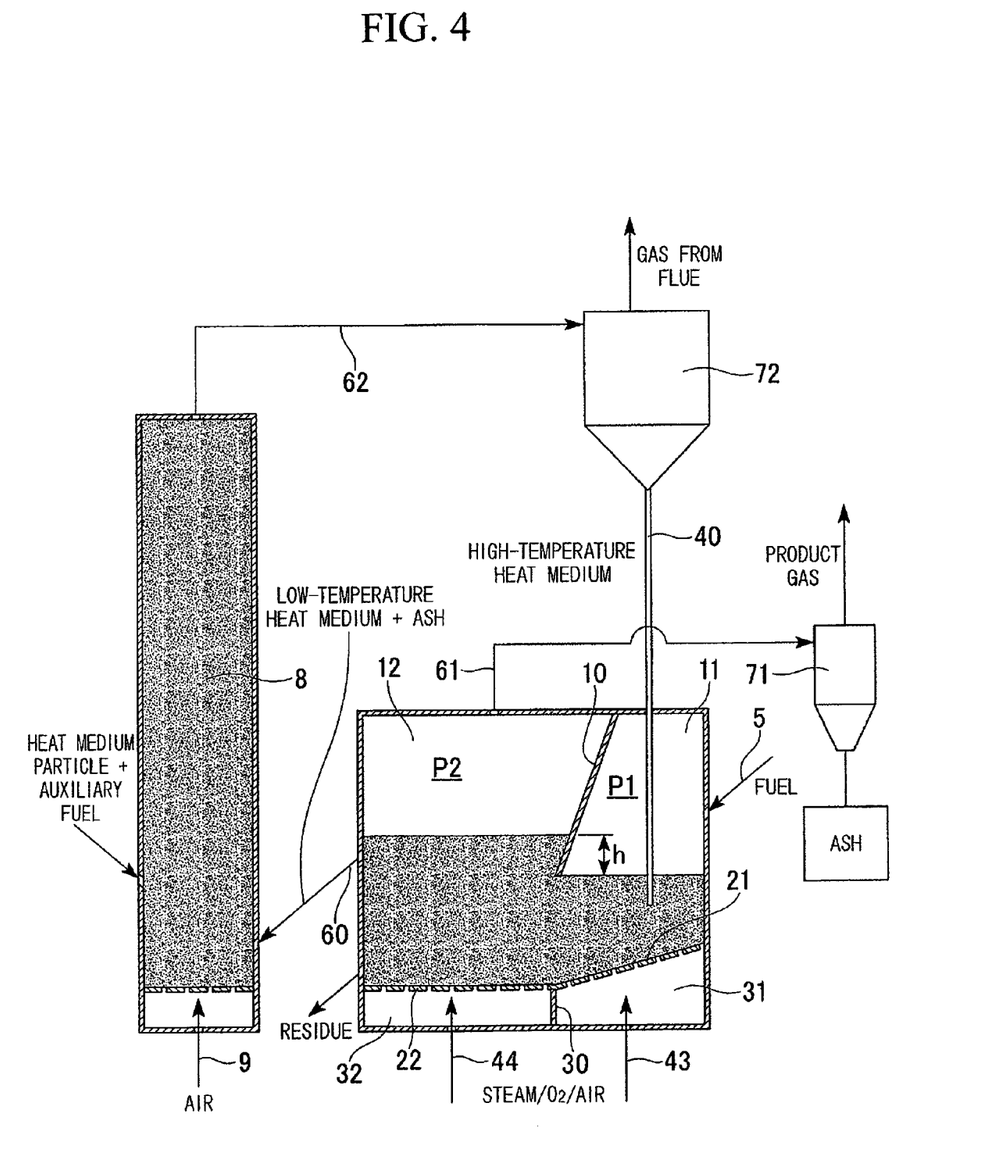
FIG. 4 is a schematic diagram of the structure of a gasifying apparatus, embodying the gasifying method of the invention, which can supply reaction heat using flow of external high-temperature particles.

FIGS. 3 and 4 are schematic diagrams of the structure of other decoupled fluidized bed gasifying apparatuses that embody other two gasifying methods of the invention. Of them, the gasifying apparatus shown in FIG. 3 provides the amount of heat required for various physical and chemical endothermic processes, such as drying and gasification of fuel, using internal combustion like the apparatus shown in FIG. 2. Further, the gasifying apparatus shown in FIG. 4 can simultaneously provide the amount of heat required for each physical and chemical endothermic process, using the heat medium particles of external circulation. Here, the heat medium particles are exactly equivalent to other heat source bodies in the principle of the invention shown in FIG. 1. Accordingly, although the gasifying apparatuses shown in FIGS. 3 and 4 similarly implement the operational principle and technical idea of the gasifying method of the invention, each of them has the following techniques and process features over the gasifying apparatus shown in FIG. 2.

The gasifying apparatus shown in FIG. 3 is similar to the apparatus shown in FIG. 2, and both the right and left reaction chambers of the gasifying reactor, i.e., the gasifying and reforming reaction chamber 12, and the drying and pyrolyzing reaction chamber 11 are formed by dividing a reaction space of a large fluidized bed reactor by the reaction chamber partition plate 10. Furthermore, the lower end of the partition plate 10 inclines toward the right reaction chamber 11, and the right end of the right gas dispersion plate 21 inclines upward (in other words, the right gas dispersion plate 21 inclines downward toward the left gas dispersion plate 22).

By inclining the lower end of the partition plate 10 toward the right reaction chamber 11, the left reaction chamber 12 has an enlarged upper space. Since the enlargement of an upper space is advantageous to a reduction in gas speed and a decrease in mixing of particles into the gas in the reaction chamber 12, the particles that flow out of the left reaction chamber 12 can be reduced with the generation of product gas.

Further, the inclining right gas dispersion plate 21 that are installed in the right reaction chamber 11 can promote the movement and diffusion of the particles, which have been fluidized in the reaction chamber 11, to the left reaction chamber 12. Since the fluidizing gas, i.e., air or oxygen to be supplied to the right reaction chamber 11 easily drifts to the left reaction chamber 12, there is a possibility that it becomes difficult to fluidize the particles on the rightmost side (back side) of the drying and pyrolyzing reaction chamber 11. On the other hand, by using the inclining gas dispersion plate 21, the degree of drift of gas is reduced, and formation of a non-fluidized region in the rightmost section of the drying and pyrolyzing reaction chamber 11 is prevented.

By the inclining reaction chamber partition plate 10 and the inclining gas dispersion plate 21 of the right reaction chamber 11 that are adopted in the gasifying apparatus shown in FIG. 3, the gasifying apparatus realizes the principle of the decoupled gasifying method of the invention better, is advantageous to high gasification efficiency and low tar generation, and can be effectively used for high water-containing fuel.

In the gasifying apparatus shown in FIG. 4, a high-temperature heat-medium particle supply passage 40 that supplies the high-temperature heat-medium particles from outside is provided at an upper end of the right drying and pyrolyzing reaction chamber 11. Installation of the fuel supply passage 5 and the product gas outlet 61 is similar to that of the gasifying apparatus shown in FIGS. 2 and 3. Further, the reaction chamber partition plate 10 between both the right and left reaction chambers 11 and 12, and the gas dispersion plates 21 and 22 installed for both the reaction chambers adopts the structure similar to that of FIG. 3.

In the right drying and pyrolyzing reaction chamber 11, the fuel supplied from the fuel supply passage 5 interacts with the heat medium particles from outside, which are supplied from the high-temperature heat-medium particle supply passage 40, and supplies the amount of heat required for drying of fuel and fuel pyrolyzing. After going through this process, the heat medium particles are mixed the steam, pyrolyzing gas and char that are generated by drying and pyrolyzing of fuel, enter the left gasifying and reforming reaction chamber 12, and continuously provide the amount of heat to endothermic reactions, such as the gasification of char occurring in the reaction chamber, and tar/hydrocarbon reforming. Unlike the embodiment shown in FIGS. 2 and 3, a component that does not contain oxygen, such as steam, is mainly supplied from the fluidizing gas supply passage 43 of the right reaction chamber 11 and the gasifying agent supply passage 44 of the left reaction chamber 12. However, a fixed quantity of oxygen or air can also be mixed into the gas supply passages so that part of the amount of heat required for a physical change and a chemical reaction that occur in both the reaction chambers may be secured by internal combustion. Since the heat medium particles from outside supply the amount of heat, the amount of the oxygen or air included in the fluidizing gas supply passage 43 and the gasifying agent supply passage 44 is significantly smaller than that of the fluidizing gas supply passage 41 and gasifying agent supply passage 42 of the gasifying apparatus shown in FIGS. 2 and 3. Since the temperature of the flow of particles sent to the left gasifying and reforming reaction chamber 12 after receiving various operations in the right reaction chamber 11 is significantly low as compared with the temperature of the heat medium particles supplied to the right reaction chamber 11 from the high-temperature heat-medium particle supply passage 40 (due to drying of fuel and heat adsorption of pyrolyzing), the oxygen/ air of a comparatively high ratio can be mixed into the gasifying agent supply passage 44 of the left reaction chamber 12. This represents the significant feature of the gasifying method of the invention that individual control can be implemented for the chemical reactions that actually occur in both the reaction chambers 11 and 12.

In the left gasifying and reforming reaction chamber 12, after the amount of heat is provided for gasification of char, and tar/hydrocarbon reforming reaction, the temperature of the heat medium particles will be further lowered. Such particles whose temperature has been lowered can be sent to a heat medium particle reheater 8 along with the char particles that the gasification reaction has not finished. The particle reheater 8 is a gas fluidized bed combustor. The particles that enter the particle reheater 8 from the gasifying and reforming reaction chamber 12 flow and are transported along with the air supplied by an air supply means 9, and the char in the particles is combusted along with an auxiliary fuel, thereby providing the amount of heat required for the re-heating of the heat medium particles. After the heat medium particles whose temperature has risen by the re-heating is separated into transport gas, i.e., the gas from a flue 62, in a reheater cyclone separator 72, they are again sent and circulated to the right drying and pyrolyzing reaction chamber 11 as the high-temperature heat-medium particles 40 from outside. Further, the particles contribute to drying and gasification of fuel according to the aforementioned process and method. The gas from the flue 62 is discharged after passing through the reheater cyclone separator 72, and is isolated from the product gas that is discharged from the left gasifying and reforming reaction chamber 12.

As compared with the gasifying apparatuses shown in FIGS. 2 and 3, in this gasifying apparatus, the reheater 8 that combusts unreacted char to heat the heat medium particles whose temperature has been lowered is combined with the gasifying apparatus, and further, the product gas generated by the particle reheater 8 is isolated from the product gas, and is not mixed therewith. Accordingly, the gasifying apparatus prevents dilution of the final product gas with $N_2$ in actual combustion air, and $CO_2$ that is produced by combustion, and has the features of the decoupled gasifying method of the invention like the gasifying apparatuses shown in FIGS. 2 and 3 while providing the advanced decoupled fluidized bed gasifying technique that increases the concentration and calorific value of combustible gas of the product gas. That is, the fuel moisture that is evaporated in the drying and pyrolyzing reaction chamber 11 while promoting tar reforming in the gasifying and reforming reaction chamber 12 by the catalytic effect of char is used as part of the gasifying agent. Accordingly, the tar content of product gas can be reduced, the use amount of a steam gasifying agent from outside can be reduced, the overall efficiency of gasification can be improved, and this technique can also be applied to the processing of high water-containing fuel.

Although the heat medium particles from outside of the gasifying apparatus shown in FIG. 4 are typically particles composed of various kinds of sand, they have a function of heat media, such as limestone, mica, and various kinds of industrial residual particles (for example, red mud), and the particles that can be circulated in the above-mentioned system can also be used. While the substance containing metal oxides or carbonates is used the heat medium particles from outside, it can also be applied to tar reforming. Further, since fuel pyrolyzing and gasification reaction of char provide a catalytic effect not a little, they are advantageous to conversion of tar, and an improvement in gasification efficiency.

In addition to some gasifying apparatuses shown in FIGS. 2 to 4, other various embodiments based on the principle of the gasifying method of the invention can be considered. All of the gasifying apparatuses in arbitrary forms are within the technical scope of the invention as claimed in the claims as long as they releases the combination among drying or pyrolyzing of fuel, gasification of char, and tar/hydrocarbon reforming, in a fluidized bed reactor, promotes tar conversion (reforming/decomposing) using the interaction among two kinds of the reactions, and uses the evaporated fuel moisture as an effective gasifying agent.

INDUSTRIAL APPLICABILITY

The solid fuel decoupled fluidized bed gasifying method and the gasifying apparatus according to the present invention enables the technical aspects of: (1) a reduction of the tar content in product gas, (2) a reduction of the use amount of external steam, (3) an improvement of the overall efficiency of gasification, and (4) application to the processing of high water-containing fuel.

What is claimed is:

1. A solid fuel decoupled fluidized bed gasifying method comprising:
   physically separately performing drying and pyrolyzing of fuel, gasification of char, and tar/hydrocarbon reforming, which are involved in fuel gasifying processes, thereby sequentially performing all the gasifying processes in two steps including drying and pyrolyzing of a fluidized bed fuel, and gasification of a fluidized bed char, and tar/hydrocarbon reforming,
   wherein the drying and pyrolyzing of the fluidized bed fuel is performed by supplying solid fuel to a drying and pyrolyzing reaction chamber within the drying and pyrolyzing reaction chambers, fluidizing the solid fuel by a fluidizing gas supplied from the bottom of the drying and pyrolyzing reaction chamber, and keeping the temperature of the drying and pyrolyzing reaction chamber at 500 to 1000° C. according to the amount of heat generated by combustion by the oxygen included in the fluidizing gas and/or the amount of heat possessed by the high-temperature heat-medium particles of the drying and pyrolyzing reaction chamber,
   wherein the gasification of the fluidized bed char, and the tar/hydrocarbon reforming are performed in a gasifying and reforming reaction chamber that communicates with the drying and pyrolyzing reaction chamber adjacent thereto, and
   wherein steam generated by the drying and pyrolyzing of the fuel that has passed through the drying and pyrolyzing reaction chamber, and pyrolyzing gas and char containing tar are sent to the gasifying and reforming reaction chamber, without performing other intermediate processing, and are fluidized by a gasifying agent supplied from the bottom of the gasifying and reforming reaction chamber, the temperature of the gasifying and reforming reaction chamber is kept at 500 to 1000° C. according to the amount of heat generated by combustion of the oxygen included in the gasifying agent and/or the amount of heat possessed by the high-temperature heat-medium particles from the drying and pyrolyzing reaction chamber, char is gasified and at least one of tar and hydrogen is reformed to generate product gas using the steam as a gasifying agent, and the generated product gas is discharged from an upper part of the gasifying and reforming reaction chamber; and
   wherein at least one of tar and hydrocarbon reforming and pyrolyzing are performed using the char as a catalyst,
   a reaction chamber partition plate separates the two reaction chambers such that an upper end of the reaction chamber partition plate is connected to the top wall of the reaction chambers, and a lower free end of the reaction chamber partition plate extends near the top surface of the fluidized bed;
   and wherein by a free end of a reaction chamber partition plate, which divides the drying and pyrolyzing reaction chamber from the gasifying and reforming reaction chamber and is inclined toward the drying and pyrolyzing reaction chamber, the reaction chamber partition plate is inclined as a whole, such that, an upper space of the gasifying and reforming reaction chamber is enlarged, gas speed in the gasifying and reforming reaction chamber reduces, and mixing of the particles into the gas reduces to reduce the particles which flow out of the gasifying and reforming reaction chamber; and wherein a reaction chamber partition plate separates the two reaction chambers such that an upper end of the reaction chamber partition plate is connected to the top wall of the reaction chambers, and a lower free end of the reaction chamber partition plate extends near the top surface of the fluidized bed; and wherein by a free end of a reaction chamber partition plate, which divides the drying and pyrolyzing reaction chamber from the gasifying and reforming reaction chamber and is inclined toward the drying and pyrolyzing reaction chamber, the reaction chamber partition plate is inclined as a whole, such that, an upper space of the gasifying and reforming reaction chamber is enlarged, gas speed in the gasifying and reforming reaction chamber reduces, and mixing of the particles into the gas reduces to reduce the particles which flow out of the gasifying and reforming reaction chamber.

2. The solid fuel decoupled fluidized bed gasifying method according to claim 1,
   wherein the steam generated by drying and pyrolyzing of the fuel in the drying and pyrolyzing reaction chamber, and the pyrolyzing gas and char containing tar are sent into a particle layer in the gasifying and reforming reaction chamber, the steam is provided to gasifying and reforming reactions as a gasifying agent, and the tar/hydrocarbon reforming is performed when the pyrolyzing gas and steam flow through a fluidized bed particle layer having char, thereby exhibiting the catalytic effect of the char to the reforming reaction.

3. The solid fuel decoupled solid fuel fluidized bed gasifying method according to claim 1,
   wherein the high-temperature heat-medium particles from outside to be supplied to the drying and pyrolyzing reaction chamber provide the amount of heat required for drying and pyrolyzing of fuel by the interaction between the flow of the particles and a fuel supplied to the drying and pyrolyzing reaction chamber, and the particles provides reaction heat to gasification of char and tar/hydrocarbon reforming after being conveyed to the gasifying and reforming reaction chamber, and the heat medium particles from outside whose temperature has fallen by providing the amount of heat to the gasification of char, and tar/hydrocarbon reforming are discharged from the gasifying and reforming reaction chamber.

4. A solid fuel decoupled gasifying apparatus comprising:
   a fluidized bed including a drying and pyrolyzing reaction chamber located on the fuel supply side of the fluidized bed, and a gasifying and reforming reaction chamber that communicates with the drying and pyrolyzing reaction chamber adjacent thereto;
   a horizontal gas dispersion plate that is installed for both the reaction chambers and located at a predetermined height in both the reaction chambers;
   a first gas dispersion box and a second gas dispersion box that are located below the gas dispersion plate, and correspond to the drying and pyrolyzing reaction chamber and the gasifying and reforming reaction chamber, respectively;

a fluidizing gas supply passage that provides fluidizing gas through the first gas dispersion box;

a gasifying agent supply passage that provides a gasifying agent through the second gas dispersion box;

a solid fuel supply means attached to an upper part of the drying and pyrolyzing reaction chamber; and a product gas outlet attached to an upper part of the gasifying and reforming reaction chamber.

5. The solid fuel decoupled fluidized bed gasifying apparatus according to claim 4, wherein the drying and pyrolyzing reaction chamber and the gasifying and reforming reaction chamber are formed by division of the fluidized bed by a reaction chamber partition plate, a gap between a lower end of the reaction chamber partition plate, and the gas dispersion plate is a transport passage that allows the drying and pyrolyzing reaction chamber to communicate with a gasifying and reforming reaction chamber, and the lower end of the reaction chamber partition plate is located in a particle layer of the fluidized bed.

6. The solid fuel decoupled fluidized bed gasifying apparatus according to claim 5, wherein an upper end of the reaction chamber partition plate is fixed to an inner surface of a container that forms the fluidized bed, and a lower part of the reaction chamber partition plate inclines toward the gasifying and reforming reaction chamber.

7. The solid fuel decoupled fluidized bed gasifying apparatus according to claim 4, wherein the gas dispersion plate are divided into a first gas dispersion plate and a second gas dispersion plate by a gas dispersion box partition plate located between the first gas dispersion box and the second gas dispersion box, and the first gas dispersion plate corresponding to the drying and pyrolyzing reaction chamber inclines downward toward the second gas dispersion plate.

8. The solid fuel decoupled fluidized bed gasifying apparatus according to claim 4, further including a heat medium particle reheater that communicates with the particle layer of the gasifying and reforming reaction chamber, wherein an upper end of the heat medium particle reheater communicates with a cyclone separator, and a lower end of the cyclone separator is provided with a high-temperature heat-medium particle supply passage that leads to the particle layer of the drying and pyrolyzing reaction chamber.

* * * * *